United States Patent
Benmoha

(10) Patent No.: US 11,449,930 B1
(45) Date of Patent: *Sep. 20, 2022

(54) METHOD AND APPARATUS FOR TRADING ASSETS IN DIFFERENT CURRENCIES

(71) Applicant: Jacky Benmoha, Holmdel, NJ (US)

(72) Inventor: Jacky Benmoha, Holmdel, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/019,359

(22) Filed: Sep. 14, 2020

Related U.S. Application Data

(63) Continuation of application No. 16/113,289, filed on Aug. 27, 2018, now Pat. No. 10,776,863, which is a continuation of application No. 11/736,583, filed on Apr. 18, 2007, now Pat. No. 10,062,107.

(51) Int. Cl.
*G06Q 40/00* (2012.01)
*G06Q 40/04* (2012.01)

(52) U.S. Cl.
CPC ............. *G06Q 40/00* (2013.01); *G06Q 40/04* (2013.01)

(58) Field of Classification Search
CPC ......... G06Q 30/00; G06Q 30/06; G06Q 30/08
USPC ........................................................ 705/37
See application file for complete search history.

(56) References Cited

U.S. PATENT DOCUMENTS

| | | | | |
|---|---|---|---|---|
| 2002/0161692 A1* | 10/2002 | Loh | .................... | G06Q 40/04 705/37 |
| 2004/0098334 A1* | 5/2004 | Brusso | .................. | G06Q 40/04 705/37 |
| 2004/0143536 A1* | 7/2004 | Haberle | ................. | G06Q 40/04 705/37 |
| 2004/0210512 A1* | 10/2004 | Fraser | .................. | G06Q 40/025 705/37 |
| 2004/0215539 A1* | 10/2004 | Doi | ........................ | G06Q 40/04 705/35 |
| 2004/0236664 A1* | 11/2004 | Sellberg | ................ | G06Q 40/06 705/37 |
| 2006/0095361 A1* | 5/2006 | Rude | ..................... | G06Q 40/04 705/37 |
| 2006/0173771 A1* | 8/2006 | Johnston | ............... | G06Q 40/04 705/37 |
| 2007/0043648 A1* | 2/2007 | Chait | .................... | G06Q 20/10 705/37 |

(Continued)

OTHER PUBLICATIONS

Currenex web site, "Currenex, Inc. is accelerating the transformation of the FX marketplace into the world of ecommerce", Jun. 5, 2000, pp. 1-10.*

(Continued)

*Primary Examiner* — Hani M Kazimi
(74) *Attorney, Agent, or Firm* — Joe Zheng

(57) ABSTRACT

Techniques to display trading assets in a preferred currency are described. According to one aspect of the present invention, a three-tier architecture is presented and includes a brokerage, a market exchange and a currency exchange. Through a consolidated trading platform, the brokerage presents all price, quotas, transactions or settlements in a preferred currency, in conjunction with the market exchange and the currency exchange. As a result, a trader always knows exactly what he/she may end up with a transaction of an asset, where a prevailing exchange rate is obtained prior to a transaction to prevent uncertainty in currency exchanges in another time.

15 Claims, 5 Drawing Sheets

(56) References Cited

U.S. PATENT DOCUMENTS

2007/0118459 A1\* 5/2007 Bauerschmidt ........ G06Q 40/00
705/37
2007/0174181 A1\* 7/2007 Brummette ............ G06Q 20/10
705/37

OTHER PUBLICATIONS

Currenex web site, fxweek, "Currenex Launches Multi-Bank Web Based FX Trading System" London-New York vol. 11 No. 18, May 1, 2000.\*

Currenex web site, James R. Kraus, American Banker.com "National/Golbal Forex Trading Sites May Erode Bank Revenues" May 4, 2000.\*

\* cited by examiner

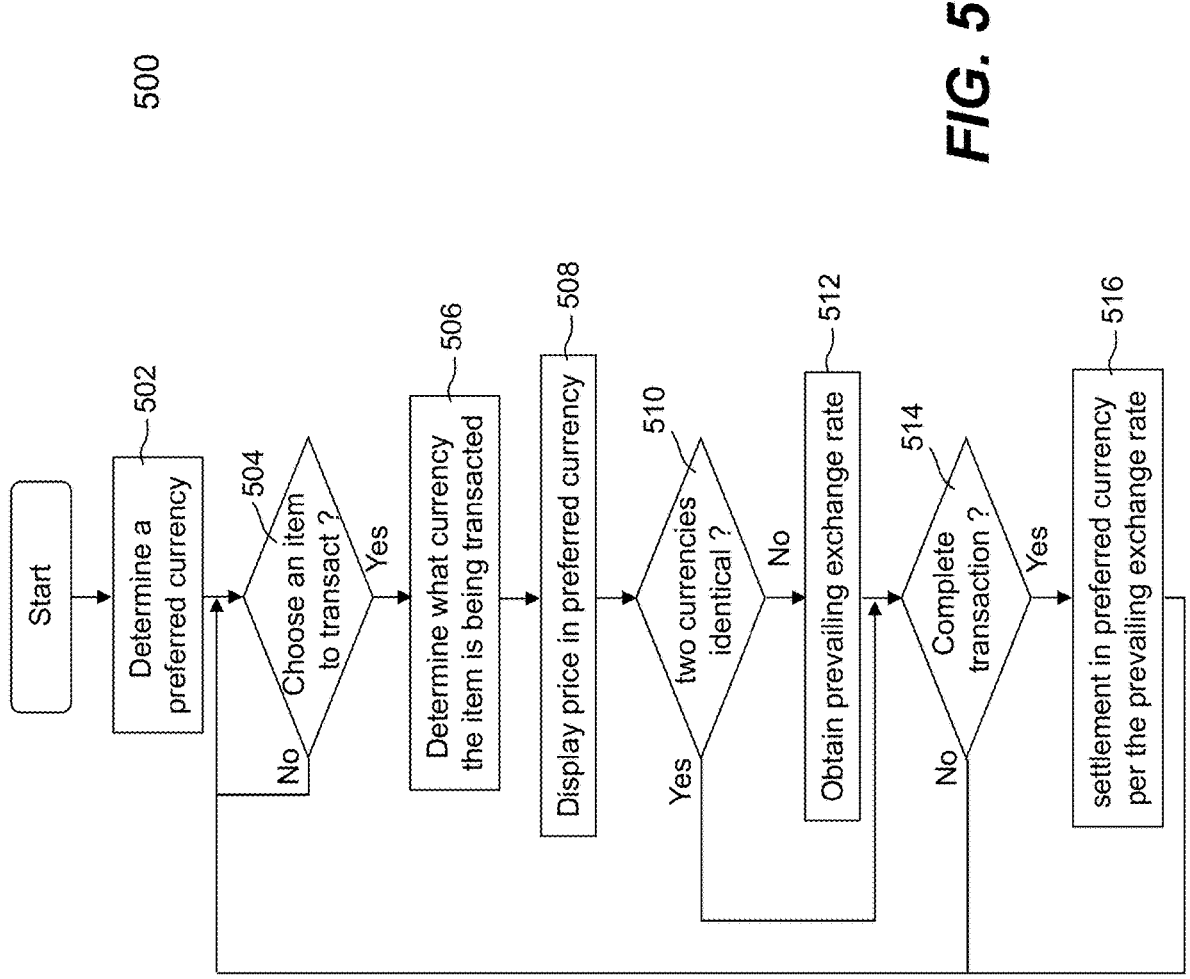

METHOD AND APPARATUS FOR TRADING ASSETS IN DIFFERENT CURRENCIES

FIELD OF THE INVENTION

The present invention is generally related to the area of transactions in finance. More particularly, the present invention is related to systems and methods for providing a consolidated trading platform allowing traders to trade various assets in a preferred currency regardless where and in what currency the asset is typically traded.

BACKGROUND

One of the successful applications on the Internet is electronic commerce. Electronic commerce is an integrative concept designed whereby business commercial communications and management are conducted through electronic methods, such as electronic data interchange and automated data-collection systems, all via the Internet. Electronic commerce is seen and utilized in many industries and markets, and it has also penetrated into the financial markets, which for many years were traded manually or with a high degree of broker intervention. The vast accessibility of the Internet and of electronic networks in general makes it possible to connect buyers and sellers more quickly and objectively.

For example, one of the largest financial services providers, Charles Schwab & Co. has changed its core business from retail to online business. With the establishment of its website www.schwab.com, Charles Schwab allows qualified investors to trade US securities at any time from anywhere as long as Wall Street is in session. To attract investors residing in other countries, Charles Schwab has websites in different foreign languages, such as Chinese. As a result, investors residing in China can trade the US securities from their accounts at Charles Schwab via the Internet.

However, all accounts at Charles Schwab must be in US dollars and all transactions must be conducted in US dollars. FIG. 1 illustrates a process how an investor in China would trade securities listed on a US exchange (e.g., NASDAQ). Because all securities listed on a US exchange are traded in US dollars the investor must first pre-allocate a bulk amount in his/her local currency (e.g., RMB ¥) and look for a source to convert the amount into US dollars that are then deposited into a brokerage (e.g., Charles Schwab) by wire or check. Through the brokerage, the investor may place multiple orders to buy stocks being traded on a US exchange. At a later time, when the investor wishes to realize the profit or loss on his US dollar-denominated stock he must sell his stock and then separately find a foreign exchange resource to convert the settlement of selling the stock back to his local currency. At the time of buying or selling the stocks, as well as during the whole period the investor held the stocks, the investor had no certain knowledge of what profit or loss he was going to get because the currency exchange rate must be obtained for a bulk amount at another time, which may fluctuate significantly enough to affect the ultimate profit or loss.

One of the problems in the current trading system is that the currency conversion is not at a transactional level. There is a great need for an improved system which performs currency conversion on a transactional level so that a trader or investor knows exactly what profit or loss may occur with a transaction. It is desirable for a trading system to be able to show prices as well as conduct all transactions in a currency preferred by an investor regardless of whatever currency being used in the primary market for the security/asset.

SUMMARY OF THE INVENTION

This section is for the purpose of summarizing some aspects of the present invention and to briefly introduce some preferred embodiments. Simplifications or omissions in this section as well as in the title and the abstract of this disclosure may be made to avoid obscuring the purpose of the section, the title and the abstract. Such simplifications or omissions are not intended to limit the scope of the present invention.

Broadly speaking, the invention relates to methods, processes and systems for conducting security transactions in a preferred currency regardless of what original or market currency the securities are being traded in and where the transaction may take place. Securities include but are not limited to a wide array of electronically traded financial assets such as stocks, bonds, options, commodities (e.g., oil, gold), futures/derivatives contracts, funds, index funds, mutual funds, exchange traded funds. According to one aspect of the present invention, a three-tier architecture is presented, which includes a brokerage, a market exchange where securities/assets are traded, and a currency exchange where amounts in one currency can be converted to corresponding amounts in another currency at prevailing rates. Through a consolidated trading platform, the brokerage presents all prices, market data, P&L estimates, and transaction results or settlements in a preferred currency, in conjunction with the market exchange and the currency exchange. As a result, a trader always knows exactly what he/she may end up with a transaction of an asset. Furthermore, according to another aspect of the present invention, when the transaction of the asset is actually performed, the consolidated trading platform can also perform a currency conversion automatically based on specified conditions. Herein the term "trader" represents any initiator of the securities transaction, which includes but is not limited to an individual investor, an institutional investor, an asset manager, a hedge fund, or an electronic order system which automates the work of a human trader or an electronic "black box" algorithmic trading system.

According to still another aspect of the present invention, orders with conditions (e.g., a limit order, or a stop order) are only executed when the conditions are met with reference to the market price from the market exchange together with the currency exchange rate from the currency exchange.

As it is well known that when investing in another country or in another currency, cost and risk are incurred when a currency conversion is performed, traders trading in the same preferred or home currency would benefit if their transactions could be performed without any currency conversion. Therefore, according to still another aspect of the present invention, the consolidated trading platform analyzes transactions where two or more traders have placed orders in the same assets to determine whether or not the traders can be matched directly without currency conversion even when they share a preferred currency which may differ from the market currency for the asset.

The invention may be implemented in numerous ways, including a method, system, device, or a computer readable medium. Several embodiments of the invention are discussed below. In one embodiment, the invention is a method for providing a consolidated trading platform and the method comprises: providing access to a trading server that is coupled to a currency exchange server and a market exchange server; determining the preferred currency chosen by the trader, determining whether an asset is being chosen for trading; determining the market currency of the asset being traded at the market exchange; receiving a prevailing currency exchange rate from the currency exchange server if the preferred currency is not identical to the market currency; receiving a price of the asset being traded from the market exchange server, converting the price received by the trading server from the market exchange server to the preferred currency using rates supplied by the currency exchange server and, if the trader chooses to transact the asset, performing a transaction of the asset on the market exchange and a conversion of the proceeds of the transaction into the preferred currency on the currency exchange.

According to another embodiment, the present invention is a software product providing a consolidated trading platform. The software product may be loaded in a computing machine to provide the functions, benefits, objects and processes contemplated in the present invention. The computing machine may be a server or servers provided by a financial institution. The software product comprises: programming code for providing access to a trading server that is coupled to a currency exchange server and a market exchange server; programming code for determining whether an asset is being chosen for trading; programming code for determining the preferred currency chosen by a trader; programming code for determining a market currency of the asset being traded; programming code for receiving a prevailing currency exchange rate from the currency exchange server if the preferred currency is not identical to the market currency; programming code for receiving a price of the asset being traded from the market exchange server, converting the price received by the trading server from the market exchange server to the preferred currency using rates supplied by the currency exchange; and programming code allowing the trader to transact the asset, performing a transaction of the asset on the market exchange and a conversion of the proceeds of the transaction into the preferred currency on the currency exchange.

Accordingly, one of the objects of the present inventions is to provide a consolidated platform for conducting security transactions in a preferred currency regardless what original or market currency the securities are being traded in and where the transaction may take place.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 5 shows a flowchart or process of currency neutral trading.

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
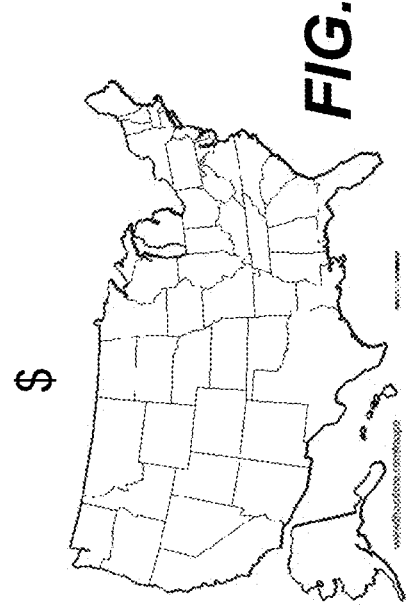
FIG. 1 shows a process how an investor in China would trade a security item listed on a US exchange (e.g., NAS-DAQ)
Figure 1:
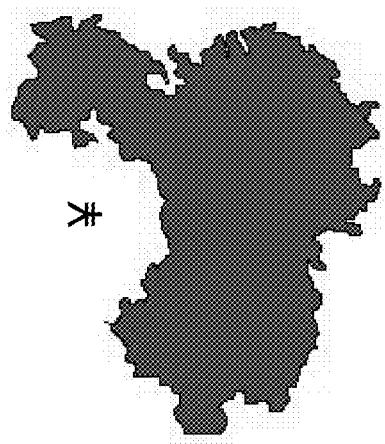
Figure 2A:
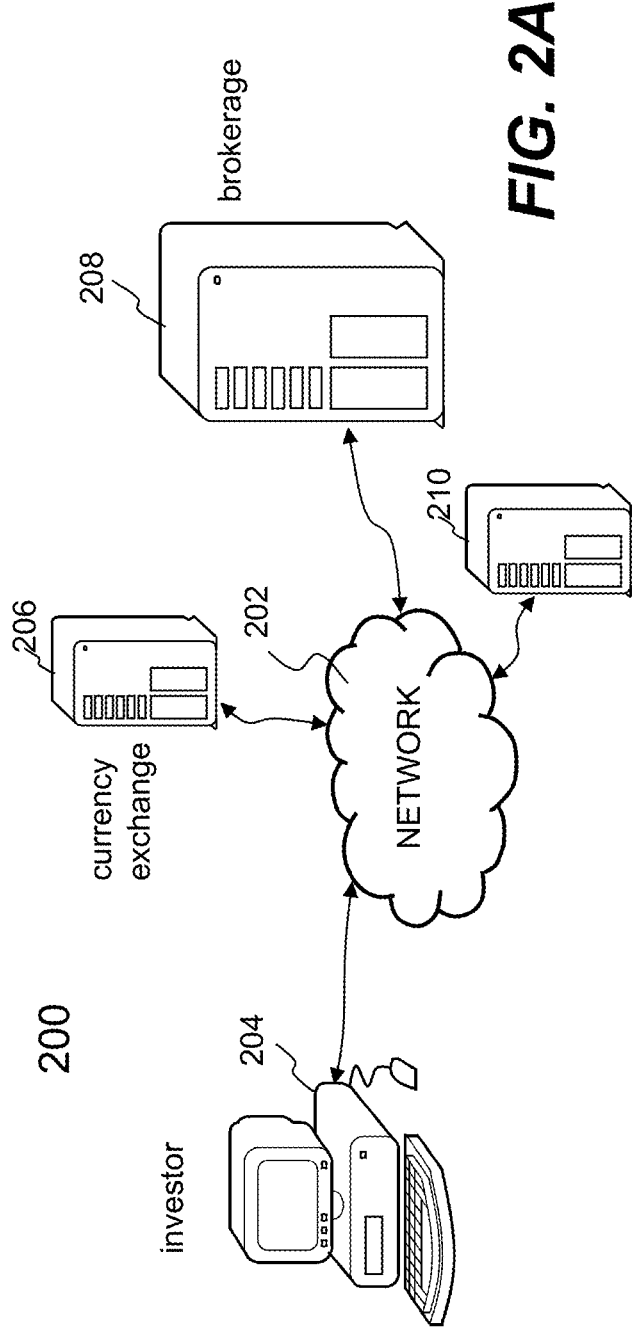
FIG. 2A illustrates a system configuration in which the present invention may be practiced in accordance with one embodiment thereof.

Referring now to the drawings, in which like numerals refer to like parts throughout the several views. FIG. 2A illustrates a system configuration 200 in which the present invention may be practiced in accordance with one embodiment thereof. The configuration 200 includes a network 202 that may be the Internet, the Intranet and a data network of other private or public networks, and in form of wireless or landlines. Coupled to the network 202 is a client machine 204 that represents one of many client machines that may be accessed by or associated with traders residing anywhere. As used herein the client machine may include, but is not limited to, any form of desktop or laptop or server computer, handheld wireless device, or mobile phone which allows an investor to communicate electronically for trading purposes. Further, a trader may include, but not be limited to, a user, an individual, an investor or an institution that transact (e.g., buy or sell) assets, wherein the assets may include, but not be limited to, various securities. Examples of securities and assets include, but are not limited to, stocks, options, bonds, futures contracts, commodities (oil/gold), derivatives contracts, mutual funds, exchange traded funds, or any other OTC (over the counter) or exchange listed instruments. Exemplary issuers of securities include commercial companies, government agencies, local authorities and international and supranational organizations (such as the World Bank).

Also coupled to the network 202 are three servers 206, 208 and 210. The server 206 represents a bank, an exchange agency, a multibank portal or matching service providing a currency exchange rate to buy or sell a type of currency for another. The server 208 represents a brokerage (e.g., Scottrade) to facilitate a transaction decided by a trader. The server 210 represents an asset or market exchange (e.g., NYSE) where an asset is caused to change hands. According to one aspect of the present invention, assuming a user has already established an account with the brokerage and authorized to access the account, what the user sees is everything in a preferred currency (e.g., euro, yen or RMB) including all transactions (e.g., to sell or buy an asset) and profit and loss. One of the features, benefits, and advantages of the present invention is to provide a mechanism that shows all transactions in a preferred currency regardless of whatever currency an asset is originally priced. The mechanism conducts a transactional level currency conversion. As a result, a trader knows exactly what profits and losses he/she is going to get in the transaction, without being subject to uncertainty in currency conversion of another time.

Figure 2B:
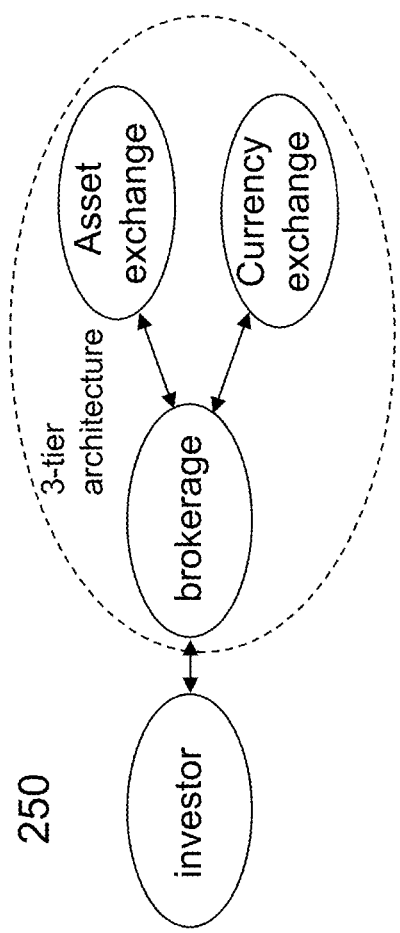
FIG. 2B shows a three-tier architecture in which there are three elements together providing various transactions in a preferred currency.

According to one embodiment, the present invention is based on a three-tier architecture as shown in FIG. 2B in which there are three elements together providing a consolidated trading platform. These three elements are communicating over a network, together providing all transactions in a local currency upon a real-time transactional level currency conversion. Depending on implementation, respective modules may be executed in each, some or all of the elements. It should be noted, however, the three elements may be implemented in a single computing machine which may be viewed as a single server or distributed over many servers owned by different organizations.

Figure 3:
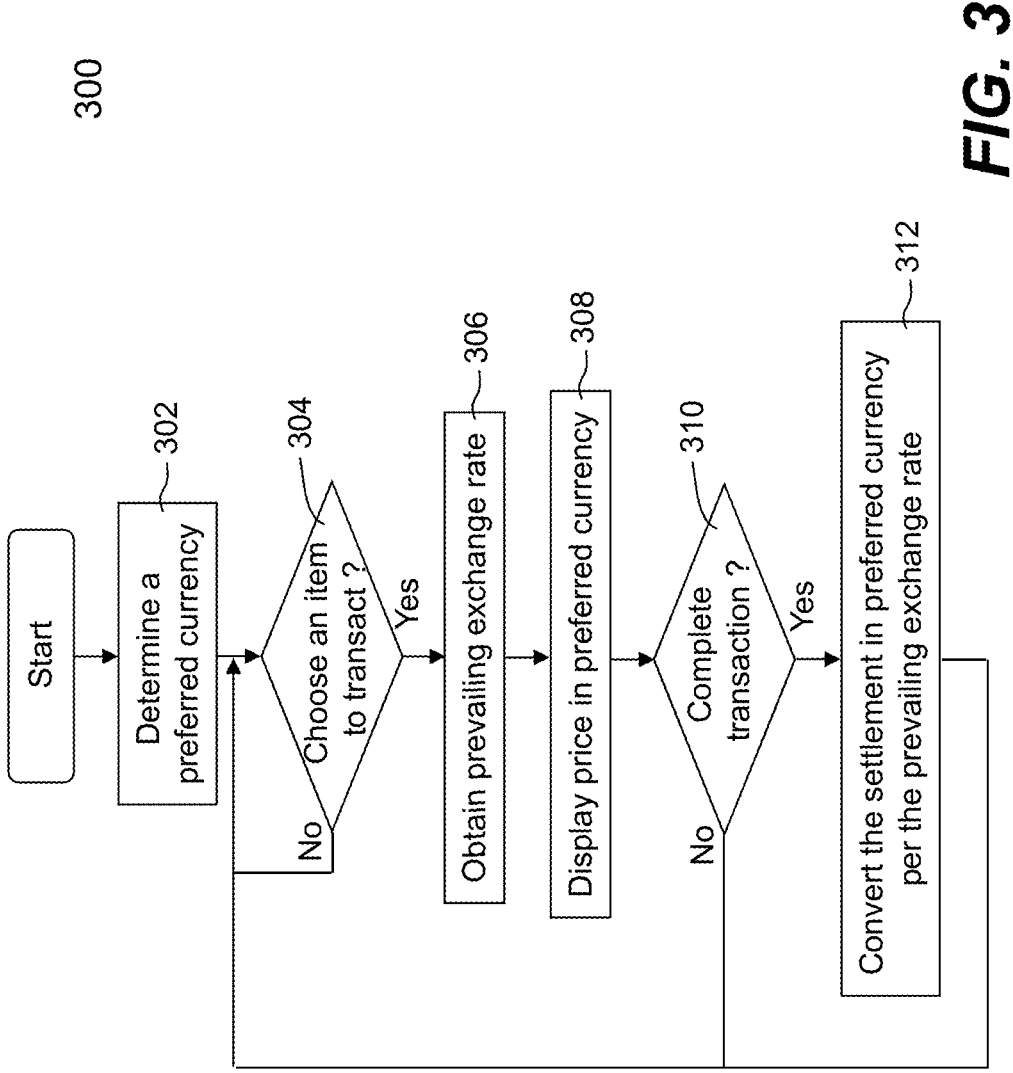
FIG. 3 shows a flowchart or process of conducting a transaction by a trader in a chosen currency other than a market currency.

FIG. 3 shows a flowchart or process 300 of conducting a transaction by a trader. The process 300 may be implemented in software, hardware or a combination of both. The process 300 starts at 302 where it determines what type of currency (e.g., Yen, RMB, EURO) that has been determined by the trader. For example, the trader resides in Japan and keeps his money in Japanese yen, thus the preferred currency is the Japanese yen. Once the currency is determined, all subsequent transactions, market data or quotes are presented in the chosen currency in conjunction with a prevailing currency exchange rate provided by an exchange agent. At 304, the process 300 determines whether an item (e.g., a stock of XYZ company) has been chosen for transaction (e.g., buying or selling the stock). If a trader has not selected an item for trading, the process 300 goes back awaiting a selected item. Based on the preferred currency, a prevailing exchange rate is obtained at 306 from a currency exchange. In one embodiment, the prevailing exchange rate is provided by a participating financial agency that is willing to buy the Japanese yen and sell US dollars at the published exchange rate.

The item is assumed to be priced in US dollars. Given the prevailing exchange rate, the various costs of the item are displayed in the Japanese yen at 308. The costs include, but may not be limited to, a current market cost of the item to own or to sell, a transaction cost, and a total cost including all the costs and fees. Thus the trader has certain knowledge of what to pay for the item, or profit or loss when selling the item.

The process 300 now goes to 310 where the trader decides whether the item shall be bought or sold. If for some reason that the trader decides not to continue the transaction (e.g., not to own or sell the asset), the process 300 goes back to 302 where the trader may choose another item for trading. Now it is assumed that the trader decides to proceed with the item (e.g., to own or sell the asset), the process 300 goes to 312 where the transaction is completed (i.e., settled) in the preferred currency.

In one embodiment, to complete the transaction in the preferred currency, the currency exchange converts all settlements to the preferred currency per the prevailing exchange rate, as if the item has changed hands in the preferred currency. In other words, as shown in FIG. 2A, the server 208 communicates with the server 210 to complete the currency conversion. Depending on implementation, the server 210 may be part of the brokerage or an independent agent, and the currency convention may actually happen (actually money exchanged) or credits may be used in the account.

According to another embodiment, an investor is planning to invest in the commodity of light sweet crude oil, contracts of which are priced in US dollars on the NYMEX. As the price of the contract is priced in USD while the investor has selected a home currency of EURO, one or more modules in the embodiment of the present invention monitors the prevailing interbank market price of the ratio of EUR/USD as well as the price of oil and updates the price displayed to the investor accordingly. At any point in time the price of the contract displayed to the investor follows the relationship:

Price of Asset in Home Currency=(Price of Asset in USD)/(Rate of EUR/USD)

If the price of oil is $50/barrel and the rate of EUR/USD is 1.30 (i.e. 1 EURO=1.3000 US dollars), the effective price of the asset in home currency is 38.46 Euros, and this is the price that can be displayed to the investor. It may be noted that the exchange rate used may be based on the settlement date of the asset class, for instance, a 30-day oil contract may use the EUR/USD 30-day forward rate, whereas a US equity would use a EUR/USD spot next rate.

The investor is able to view and make purchase or sale decisions based on the combined price, which contains both the asset price and the currency price.

Figure 4:
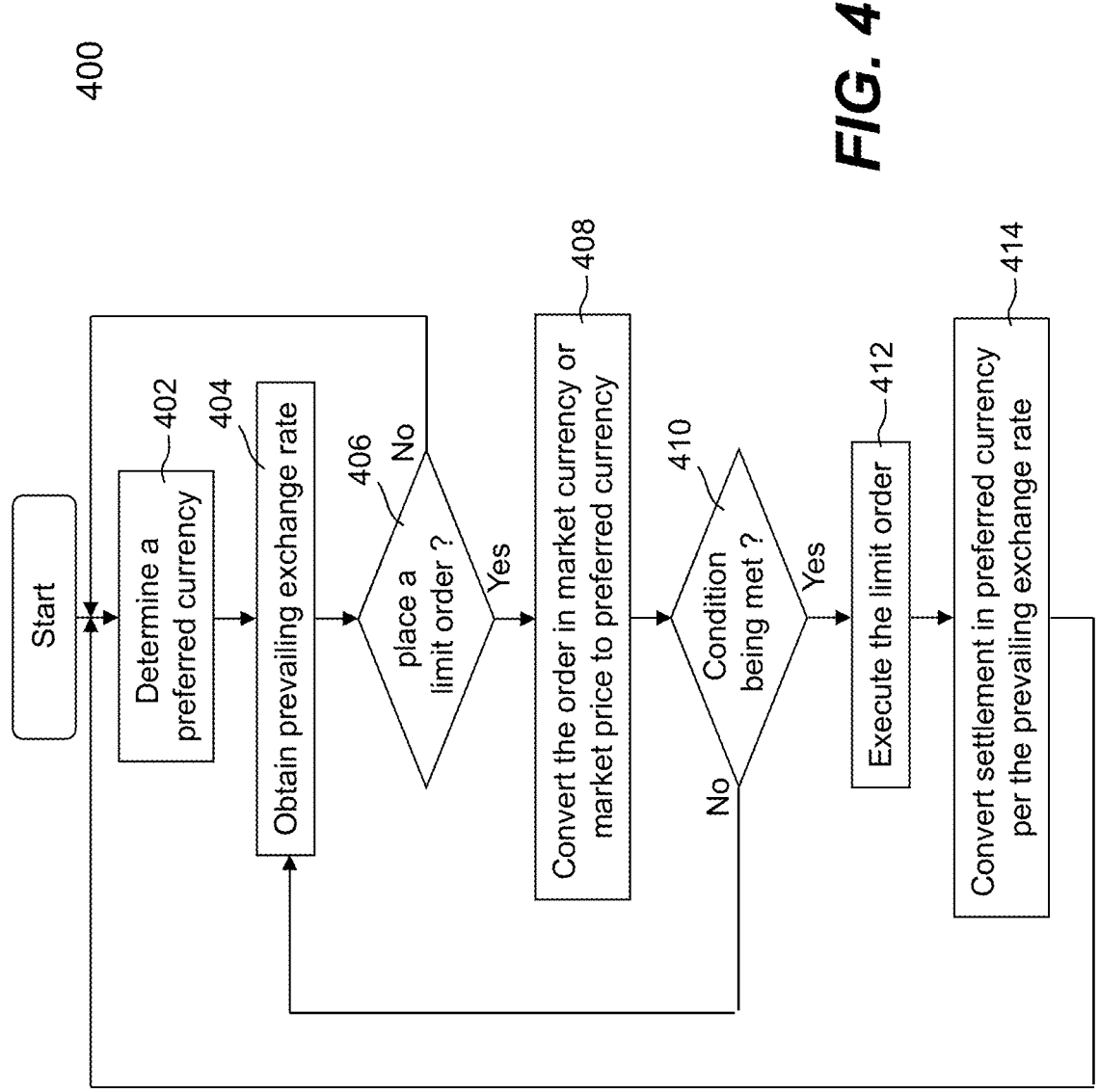
FIG. 4 shows a flowchart or process of executing a conditional order (e.g., limit order, or stop order) by a trader.

FIG. 4 shows a flowchart or process 400 of executing a limited order by a trader. The process 400 may be implemented in software, hardware or a combination of both. The process 400 starts at 402 where a preferred currency is determined by the trader. Based on the preferred currency, a prevailing exchange rate is obtained at 404 from a currency exchange. It is assumed that the item being exchanged is in a different currency (i.e., a market currency). At 406, the process 400 determines whether a limit order of an item has been placed. If no order is placed, the process 400 goes back to 402.

It is now assumed that a limit order is placed at 410, for example, to buy 100 common shares of Microsoft Corporation at RMB ¥220/share, good until cancelled. At the time the order is placed, the prevailing exchange rate from RMB to USD is 0.125 and the stock is traded at USD 28/share or RMB ¥224/share. Accordingly, the condition of the limit order is not met at 412 and the order will not be executed. The limit order is essentially an open order. As the time goes, either or both of the stock price and the exchange rate change. The process 400 goes back to 404 to obtain an updated exchange rate and unify all parameters into one currency (e.g., either in RMB or USD) at 408 so that the condition of the limit order can be verified at 410 again.

It is assumed that either the stock price has dropped a little, the exchange rate increases, or both of the stock price or the exchange rate change in favor to the condition of the limit order, the condition of buying 100 common shares of Microsoft Corporation at RMB ¥220/share is subsequently met at 410, the order is executed at 412.

To complete the transaction in the preferred currency, the currency exchange converts the settlement to RMB per the prevailing exchange rate at 414, as if the stock has changed hands in RMB. In other words, as shown in FIG. 2A, the server 208 communicates with the server 210 to complete the currency convention.

FIG. 5 shows a flowchart or process 500 of currency neutral trading. The process 500 may be implemented in software, hardware or a combination of both. As it is well known that, when investing in another country or in any currency, the cost and risk are incurred when a currency conversion is performed. Investors trading in the same home currency would benefit if their transactions could be performed without any currency conversion. In one aspect of the present invention, one embodiment implementing the process 500 is configured to analyze orders and purchases/sales and determine whether or not investors can be matched without currency conversion.

The process 500 starts at 502 where it determines what type of currency is preferred by a trader. At 504, the process 500 determines whether an item (e.g., a stock of XYZ company) has been chosen for transaction (e.g., buying or selling the stock). If a trader has not selected an item for trading, the process 500 goes back awaiting a selected item. At 506, the process 500 checks with an exchange to determine what currency the item is being traded. Regardless whatever the currency the item is being traded, the order is always in the preferred currency selected by the trader at 508.

At 510, the process 500 determines whether the currency being traded is identical to the preferred currency. If the two currencies are different, the process goes to 514 after obtaining a prevailing currency exchange rate at 512, where the trader has the option to complete the transaction or choose a different item for trading at 514. If the two currencies are identical, which means there is no need to conduct a currency convention, the process goes to 514 directly. One of the advantages, benefits and objects of the process 500 is the inherent ability to analyze orders and purchases/sales and determine whether or not investors can be matched without currency conversion.

For example, two investors sharing Euro as a home currency, both elect to send orders at 40 euro/barrel. When a match occurs (e.g., on an over-the-counter market), one embodiment of the present invention notes that these two investors traded in the same home currency, as they both take Euro as their home currency. Instead of performing currency conversion trades, the system contemplated in accordance with the present invention simply sends appropriate settlement instructions to each so that the oil contracts can be exchanged directly.

For example, the trader resides in Europe and keeps his money in Euro, thus the preferred currency is EURO. Based on the preferred currency, a prevailing exchange rate is obtained at 406 from a currency exchange. In one embodiment, the prevailing exchange rate is provided by a participating financial agency that is willing to buy the Japanese yen and sell US dollars at the published exchange rate.

It is assumed that there are two investors sharing Euro as a home currency, both elect to send orders at 40 euro/barrel. When a match occurs, the system notes that these two investors traded in home currency. Instead of performing currency conversion, the system simply sends appropriate settlement instructions to each so that the oil contracts can be exchanged directly. It should be noted, however, the ability to exchange the contracts varies based on whether the market for the asset is an OTC (over the counter) or exchange-based central counterparty and the specific settlement characteristics of the asset being traded. In the case where the market permits a direct settlement (such as an OTC market), the contracts/shares/instruments can be exchanged directly without currency conversion if both participants share the same home currency. The system will perform according to the characteristics of the market for the asset.

In any case, the settlement is displayed at 516 in the preferred currency so that the trader knows exactly how much this transaction costs, or how much profit or loss this transaction is going to realize.

One skilled in the art will recognize that elements of the system in the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

There are numerous advantages, benefits and features in the present invention. One of these advantages, benefits and features is that the platform contemplated in the present invention facilitates managements of all types of security or asset exchanges in a preferred currency.

The present invention has been described in sufficient detail with a certain degree of particularity. It is understood to those skilled in the art that the present disclosure of embodiments has been made by way of examples only and that numerous changes in the arrangement and combination of parts as well as steps may be resorted without departing from the spirit and scope of the invention as claimed. Accordingly, the scope of the present invention is defined by the appended claims rather than the forgoing description of embodiments.

I claim:

1. A method for trading an asset, the method comprising:
   receiving in a trading server an indicator of first currency from a trader, wherein the trading server is coupled to at least one currency exchange server and at least one market exchange server;
   calculating costs and fees in the first currency to own or sell the asset being traded in second currency, wherein the costs and fees are displayed on a display device, the costs and fees being display are dynamically changed in accordance with a first prevailing exchange rate between the first currency and the second currency, and even when the market value of the asset remains unchanged, wherein the first prevailing exchange rate is determined by the trading server in reference to the at least one currency exchange server;
   conducting in the trading server a transaction of the asset by transporting a transaction request from the trading server to the market exchange server upon receiving an order from trader; and
   reaching a settlement in the trading server as soon as the transaction of the asset is performed by the market exchange server in accordance with conditions set by the trader, wherein a second prevailing exchange rate is calculated from the currency exchange server right before the transaction takes place, and executes the transaction with the calculated second prevailing exchange rate, wherein costs and fees in the settlement per the second prevailing exchange rate are not identical to the displayed costs and fees with the first prevailing exchange before the transaction of the asset took place.

2. The method as recited in claim 1, wherein said conducting in the trading server a transaction of the asset comprises:
monitoring the conditions in conjunction with the currency exchange server and the market exchange server; and
performing the transaction of the asset only when the conditions have been met involving an updated market value of the asset and an updated prevailing currency exchange rate from the at least currency exchange server at a minimum cost to the trader right before the transaction takes place.

3. The method as recited in claim 1, further comprising:
receiving periodically an updated market value of the asset being traded from the market exchange server;
receiving periodically an updated prevailing currency exchange rate from the exchange server; and
determining whether the conditions have been met together with the updated market value of the asset and the updated prevailing currency exchange rate.

4. The method as recited in claim 1, further comprising:
monitoring the prevailing exchange rate in the trading server to ensure that the transaction only happens when the conditions are met with the prevailing exchange rate.

5. A method for trading an asset, the method comprising:
accessing by a client computer a trading server coupled over the Internet to at least one currency exchange server and at least one market exchange server;
receiving in the client computer an indication of first currency from a trader;
displaying on the client computer costs and fees in the first currency to own or sell the asset, wherein the costs and fees are constantly changed in accordance with a prevailing exchange rate being dynamically updated from the currency exchange server, a value of the asset being displayed changes as the prevailing exchange rate changes, even when a market value of the asset remains unchanged, wherein the trader has certain knowledge of what to pay for the asset, or profit or loss when acting on the asset;
receiving an instruction from the trader to trade the asset, wherein the prevailing currency exchange rate is determined again from the currency exchange server right before an transaction pertaining to the asset happens;
receiving a price of the asset being traded over the market exchange server, the price shown in the trading server being in the first currency in reference to the asset being traded in second currency; and
showing on the client computer a settlement of the transaction in the first currency after the transaction of the asset is executed with the calculated prevailing exchange rate, wherein costs and fees in the settlement are not identical to the displayed costs and fees before the transaction of the asset took glace.

6. The method as recited in claim 5, further comprising:
conducting the transaction of the asset between the trading server and the market exchange server upon receiving the instruction from the trader; and
performing a currency exchange of the settlement in the second currency to the first currency by the calculated prevailing currency exchange rate so that the transaction is no longer subject to currency fluctuation anytime afterwards.

7. The method as recited in claim 6, wherein the currency exchange is conducted per the calculated prevailing currency exchange rate.

8. The method as recited in claim 5, further comprising providing a currency conversion at a transactional level so that the trader knows exactly what ends up with the transaction of the asset.

9. The method as recited in claim 5, further comprising:
receiving a set of conditions for the transaction of the asset; and
monitoring the conditions in conjunction with the currency exchange server and the market exchange server.

10. The method as recited in claim 9, wherein said monitoring the conditions in conjunction with the currency exchange server and the market exchange server further comprises:
retrieving periodically the market value of the asset being traded on the market exchange server;
receiving periodically the prevailing currency exchange rate from the currency exchange server; and
determining whether the conditions have been met together with the retrieved market value of the asset and the prevailing currency exchange rate.

11. The method as recited in claim 10, wherein the transaction of the asset only happens when the conditions have been met together with the retrieved market value of the asset and the received prevailing currency exchange rate prior to the transaction.

12. A system for trading an asset, the system comprising:
a trading server provided for a trader to access the asset being traded in first currency on a market exchange server, wherein the trading server causes a display of a market value of the asset in second currency in reference to a setting of the second currency by the trader, the trading server is coupled to at least one currency exchange server, and wherein the trading server is configured to perform operations of:
displaying costs and fees in the second currency to own or sell the asset being traded in first currency, wherein the costs and fees are dynamically changed in accordance with a prevailing exchange rate between the first currency and the second currency, and even when the market value of the asset remains unchanged;
conducting a transaction of the asset by transporting a transaction request from the trading server to the market exchange server upon receiving an order from the trader; and
concluding a settlement when the transaction of the asset is performed by the market exchange server in accordance with conditions set by the trader and the prevailing exchange, wherein the prevailing exchange rate is calculated again right before the transaction takes place, and the transaction of the asset is executed with the calculated prevailing exchange rate, wherein costs and fees in the settlement are not identical to the displayed costs and fees before the transaction of the asset took place.

13. The system as recited in claim 12, wherein the operations further comprises:
- monitoring the conditions in conjunction with the currency exchange server and the market exchange server; and
- performing the transaction of the asset only when the conditions have been met involving an updated market value of the asset and an updated prevailing currency exchange rate from the currency exchange server at a minimum cost to the trader right before the transaction takes place.

14. The system as recited in claim 12, wherein the operations further comprises:
- receiving periodically an updated market value of the asset being traded from the market exchange server;
- receiving periodically an updated prevailing currency exchange rate from the exchange server; and
- determining whether the conditions have been met together with the updated market value of the asset and the updated prevailing currency exchange rate.

15. The system as recited in claim 12, wherein the operations further comprises:
- monitoring in the trading server the prevailing exchange rate to ensure that the transaction only happens when the conditions are met with the prevailing exchange rate.

* * * * *

(12) INTER PARTES REVIEW CERTIFICATE (4158th)

United States Patent
Benmoha

(10) Number: US 11,449,930 K1
(45) Certificate Issued: Oct. 21, 2025

(54) METHOD AND APPARATUS FOR TRADING ASSETS IN DIFFERENT CURRENCIES

(71) Applicant: Jacky Benmoha

(72) Inventor: Jacky Benmoha

Trial Number:

IPR2024-00378 filed Jan. 2, 2024

Inter Partes Review Certificate for:

Patent No.: 11,449,930
Issued: Sep. 20, 2022
Appl. No.: 17/019,359
Filed: Sep. 14, 2020

The results of IPR2024-00378 are reflected in this inter partes review certificate under 35 U.S.C. 318(b).

INTER PARTES REVIEW CERTIFICATE
U.S. Patent 11,449,930 K1
Trial No. IPR2024-00378
Certificate Issued Oct. 21, 2025

AS A RESULT OF THE INTER PARTES REVIEW PROCEEDING, IT HAS BEEN DETERMINED THAT:

Claims 1-15 are cancelled.

\* \* \* \* \*